April 23, 1935. J. C. RAH ET AL 1,998,589
SWITCH
Filed Jan. 17, 1931 3 Sheets-Sheet 1
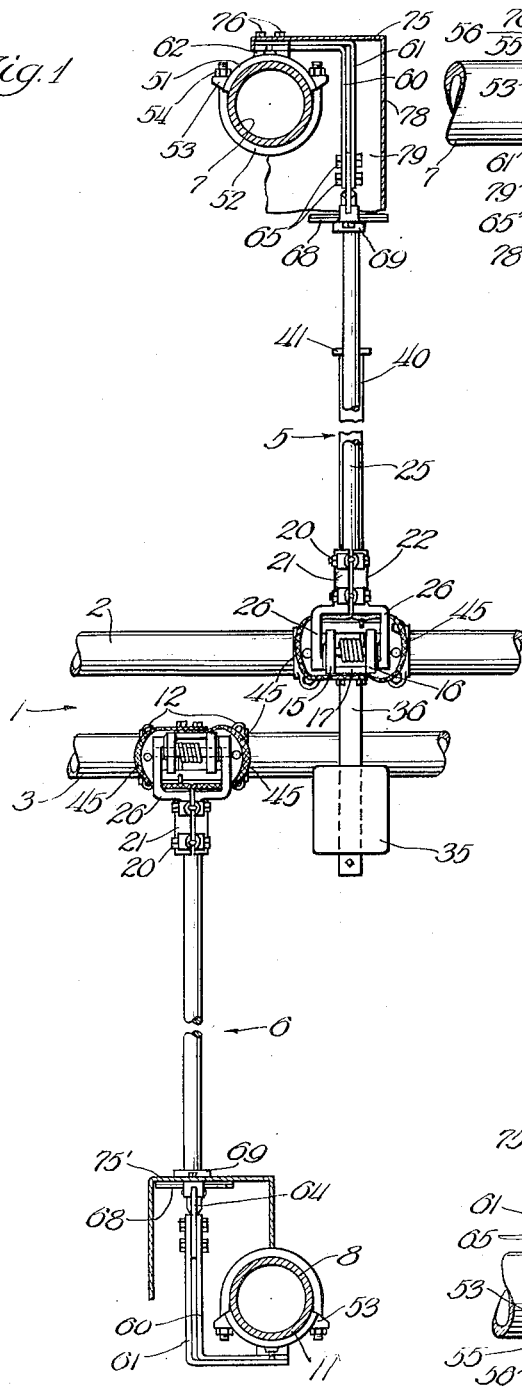
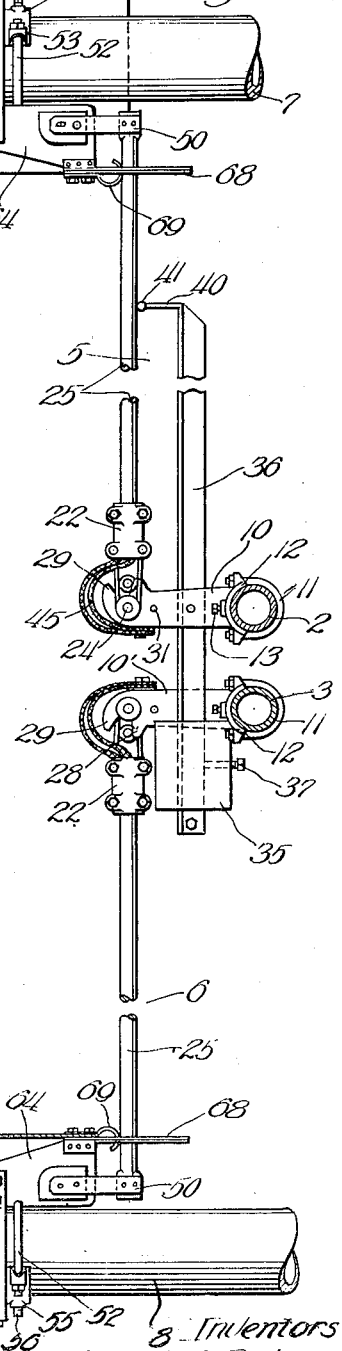
Inventors:
Joseph C. Rah
Manfred Stene
Elias S. Cornell.
By Brown Jackson Boettcher Dienner Attys.

April 23, 1935.  J. C. RAH ET AL  1,998,589
SWITCH
Filed Jan. 17, 1931   3 Sheets-Sheet 2
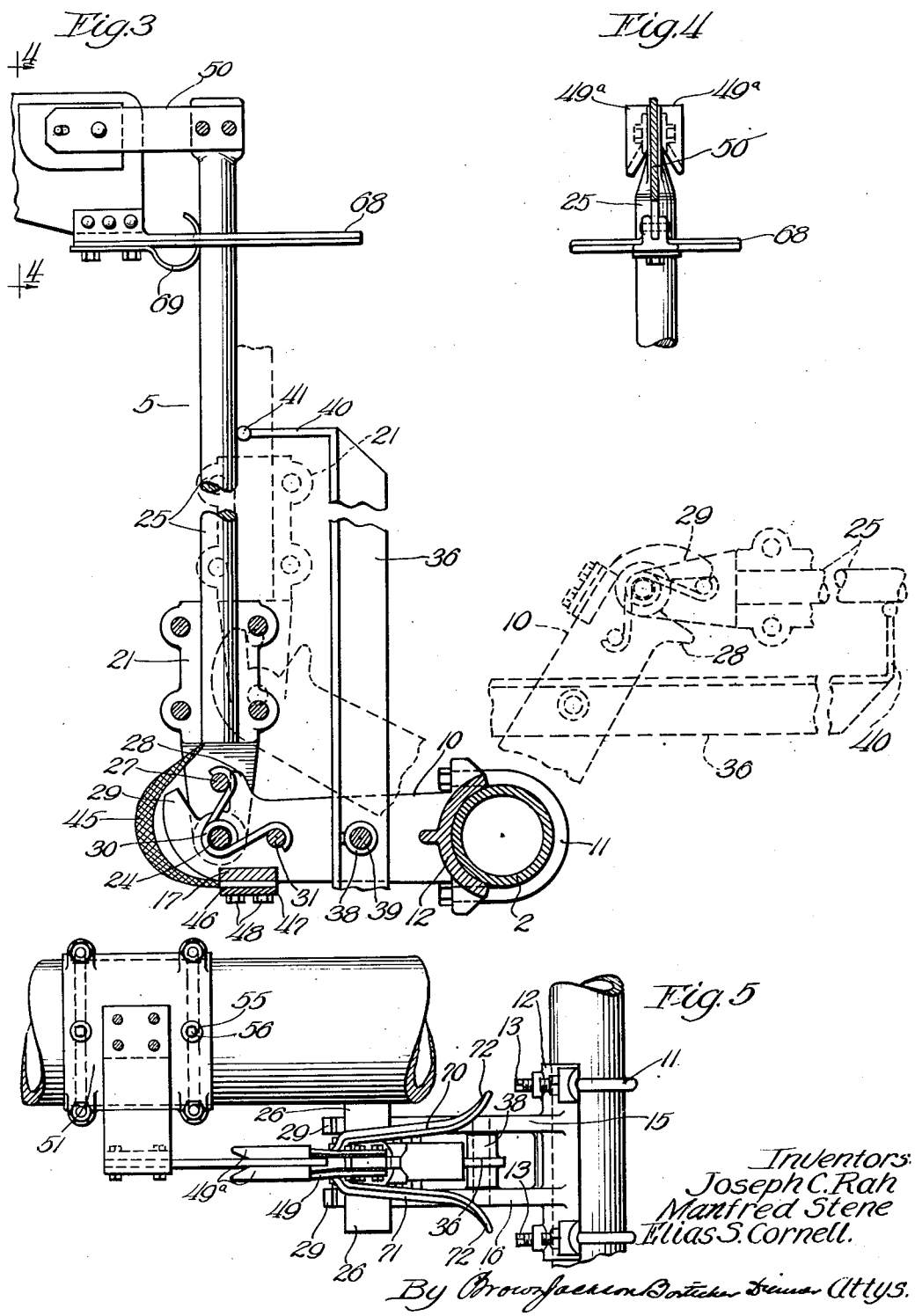

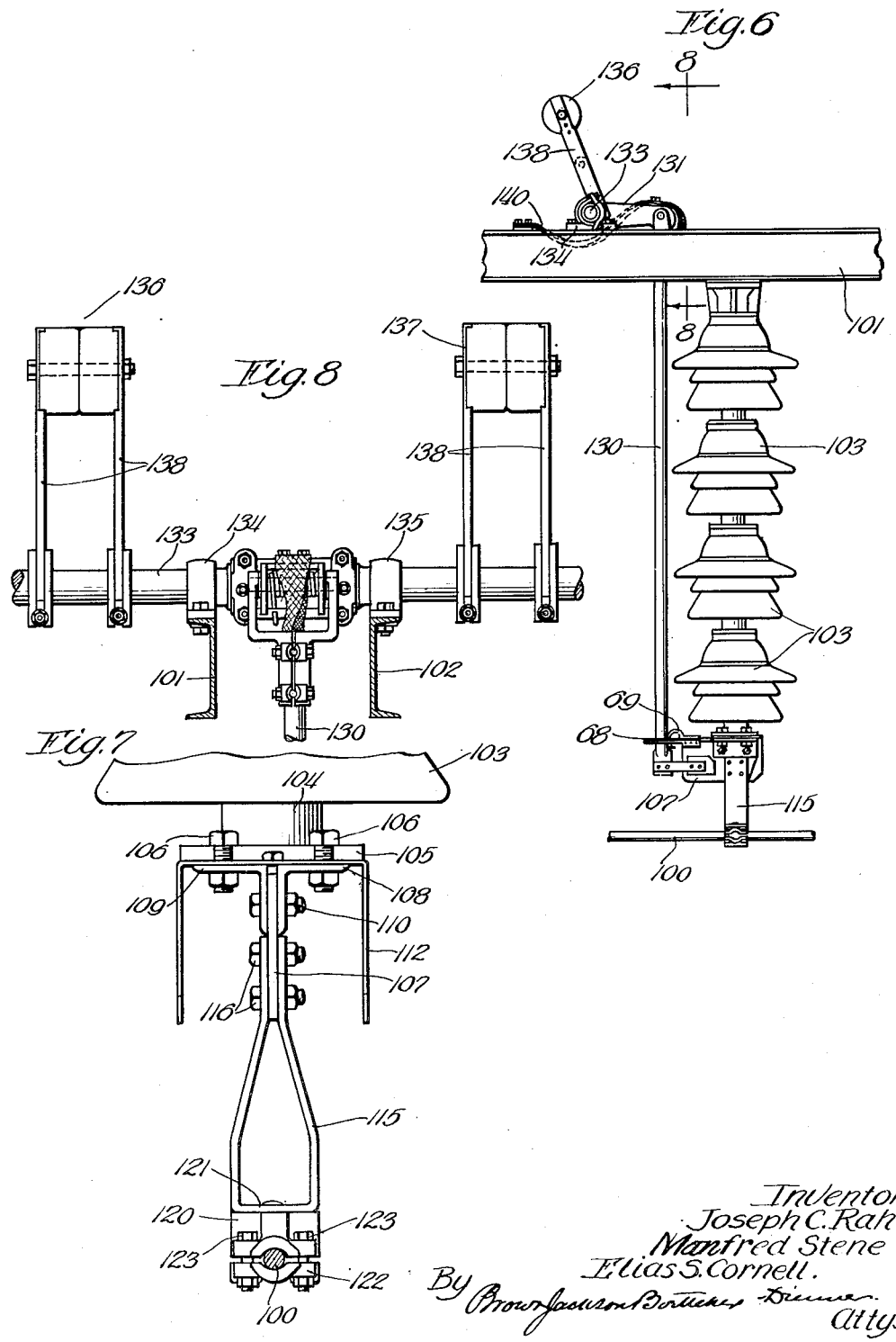

Patented Apr. 23, 1935

1,998,589

UNITED STATES PATENT OFFICE 1,998,589

SWITCH

Joseph C. Rah, Manfred Stene, and Elias S. Cornell (formerly Corneliussen), Chicago, Ill., assignors to The Delta-Star Electric Company, Chicago, Ill., a corporation of Illinois Application January 17, 1931, Serial No. 509,378

10 Claims. (Cl. 200—48)

This invention relates to electric switches in general and more particularly to electric disconnect switches. While the present switch is of general application it is particularly useful in outdoor switching stations.

In the copending application of Elias S. Corneliussen, issued as Patent No. 1,884,580 on October 25, 1932, there is shown a switching station, wherein certain of the busses are rotatably mounted and carry switches for establishing circuits between the busses. The rotatable busses each comprises a pair of parallel copper pipes mounted adjacent one another and electrically connected together to constitute a single bus. Each of these pipes is arranged for independent rotation and each includes a switch blade mounted thereon and actuated thereby to establish a circuit therewith. The present invention is particularly concerned with the provision of a switch which, while it is of general application, is especially useful in connection with a rotatable bus such as above described.

The term "bus" is used in this specification in a more limited sense than as referring merely to a pin or the like that is a part of an electric circuit. We are here using this term in the sense in which it is generally used in power plant work, to mean a conductor which constitutes a terminus for a number of power receiving or power delivering conductors. Thus it may mean a conductor which collects current from a number of sources for distribution to one or more receiving conductors. It also includes a conductor which distributes current to a number of power receiving conductors from a single source. The term "bus" is also used to include any power conductor which serves to connect any line with any one of a plurality of busses as above defined.

In connection with outdoor high voltage disconnect switches the desirability of providing an arrangement for producing an initial powerful ice-breaking movement followed by a switching movement has long been recognized. This initial ice-breaking movement is necessary in order to break any bond that may exist between the main contacts. It is one of the objects of the present invention to provide a switch which may be mounted upon a rotatable bus for actuation thereby and still have the advantages that result from the provision of an arrangement for producing a powerful initial ice-breaking movement.

It is a further object of the present invention to provide a switch having a compound switch opening motion and so arranged that two such switches can be placed back to back without interfering with one another's operation. This is particularly useful in connection with a switching bus such as above outlined that comprises two adjacent rotatable members supporting the respective switches. In the embodiments of our invention herein illustrated the blades are pivoted to actuating arms that are mounted on the respective bus members. To open a switch the associated arm is swung towards the switch contact to move the blade longitudinally towards the contact, the blade pivoting on the arm during this movement. After the arm has swung approximately 30° an abutment on the arm engages the blade and forces the blade to swing with the arm upon continued rocking of the switch arm.

The attainment of the above and further objects of the present invention will be apparent from the following specification taken in conjunction with the accompanying drawings forming a part thereof.

In the drawings:

Figure 1 is a front view of our improved switch showing a portion of the blade and contact supporting busses;

Figure 2 is a side view thereof;

Figure 3 is an enlarged fragmentary view showing the manner of supporting the blade and actuating the same;

Figure 4 is a fragmentary sectional view of the contacting end of the blade, said view being taken along the line 4—4 of Figure 3 and looking in the direction of the arrows;

Figure 5 is a top view of the switch, said view being taken with the sleet hood of the upper switch contact removed;

Figure 6 is a side view of a modified form of switch constructed in accordance with our invention;

Figure 7 is an enlarged fragmentary view of the contacting end of the switch of Figure 6, said view being taken at right angles to Figure 6; and Figure 8 is a fragmentary sectional view taken along the line 8—8 of Figure 6.

Reference may now be had more particularly to the switch shown in Figures 1 and 2. A portion of a rotatable bus is indicated at 1, said bus comprising two individual members indicated at 2 and 3. The bus members 2 and 3 may comprise separate pipes of copper or the like, said pipes being electrically connected together and being each freely rotatable independently of the other. The bus members 2 and 3 are each rotatable through an angle of approximately 120°. The manner of supporting these bus members and the manner of rotating the same forms no part of the present invention hence no description thereof need be given here. Reference may however be had to the patent of Elias S. Corneliussen, above referred to, for a description of the manner of mounting and operating the bus members 2 and 3. The bus members 2 and 3 are electrically connected together and are provided with switches 5 and 6 respectively for establishing circuits between the bus 1 and a bus 7 or a bus 8 as desired. The busses 7 and 8 extend parallel to one another and at right angles to the bus 1.

The switch 5 includes a blade carriage 10 comprising a short arm or link which is bolted to the bus member 2 by means of U bolts 11 which cooperate with a yoke member 12 formed integrally with the blade carriage. A hardened steel punch screw 13 extends through a tapped opening in a boss in the yoke 12 and is threaded into the pipe 2 so as to punch a hole therein and firmly imbed itself in the pipe thereby rigidly securing the blade carriage to the pipe 2. This method of joining the blade carriage to the pipe 2 is similar to that disclosed in the pending application of Alfred Alsaker, Serial No. 325,751, filed December 13, 1928 to which reference may be had for a more complete description of the manner of clamping the two members together, and of the construction of the screw.

The blade carriage is made of bronze or other suitable material having good electrical conductivity. The blade carriage has a pair of arms 15 and 16 extending outwardly from the clevis portion thereof, said arms being joined adjacent their outer ends by means of a plate-like web 17 formed integrally therewith. This web constitutes a base to which the terminal of a flexible conductor is connected as will be more fully set forth as the description proceeds. The inner sides of the two arms provided with bosses between which a counterweight is mounted, as will also be more fully set forth.

A blade hinge 20 comprising two similar split members 21 and 22 is pivoted to the blade carriage 10 by means of a pin 24. The hinge members 21 and 22 are securely clamped to a tube 25 which comprises the blade of the switch, and they include a pair of arms 26—26 which embrace the arms 15—16 of the blade carriage. The blade is permitted a limited amount of turning movement with respect to the carriage 10 and for this purpose a pin 27 extends through openings in the arms 26—26 and lies between projecting stops 28—29 formed integrally with each of the arms 15 and 16 of the blade carriage. These stops are spaced apart so as to permit a movement of the pin 27, and with it the blade 5, of approximately 30° about the center pin 24. A torsion spring 30 is coiled about the pin 24 with one end of the spring bearing against the pin 27 and the other end of the spring bearing against a pin 31 that extends between the arms of the blade carriage 10. This spring constantly urges the switch blade to move to a position such that the pin 27 abuts against the stop 29.

A counterbalance is provided for assisting the spring 30 in maintaining the blade 25 in a position against the stop 29 when the switch has been actuated to its open position. The counterbalance comprises a weight 35 which is secured to the lower end of a counterbalance arm 36 in any preferred manner, as by means of a set screw 37. The counterbalance arm 36 is of a generally T-shape cross-section and is provided with a pair of bearing members 38 which are welded thereto and facilitate mounting of the counterbalance between the arms of the blade carriage 10. A pin 39 is extended through the arms of the blade carriage and through the bearing members 38 and constitute a pivotal support for the counterbalance. The counterbalance is free to swing about this pin and, when the switch is closed, is maintained in the position shown in Figure 2 by gravity.

The counterbalance arm 36 is provided with a portion 40 that extends in a direction toward the blade. The portion 40 may be formed by cutting away a part of the flange of the counterbalance arm and bending the web at the cut-away portion of the flange back toward the blade. A steel rod 41 is welded to the end of the bent back portion 40 to prevent marring of the blade 25. The counterbalance arm 36 extends upwardly from the blade carriage 10 for a distance approximately two-thirds of the length of the switch although it is to be understood that the invention is not limited to this precise amount.

The switch blade 25 may comprise a copper tube. The circuit between the blade and the blade carriage is extended through strips of flexible copper braid 45 that are clamped to the blade 25 by means of the blade hinge 20. The opposite end of the braid is extended into a short length of copper tubing which is then compressed upon the braid to form a terminal 46. This terminal 46 is secured to the web 17 of the blade carriage by means of a plate 47 and a set of bolts 48. The current flowing between the blade carriage 10 and the blade 25 is then by-passed around the hinge pin 24. A floating contact structure is secured to the free end of the blade 25. This contact structure comprises a pair of flat springs 49 that are secured to the opposite sides of the end of the blade, the end of the blade being flattened to facilitate this action. These springs resiliently support a pair of contact shoes 49a—49a which are outwardly flared along the edges that first engage the stationary contact so as to facilitate the movement of the contact shoes to embrace the stationary contact. A flexible copper braid extends between the contact shoes and the switch blade to extend the circuit between the contact shoes and the braid. This form of contact structure is shown more particularly in the patent of Weldon O. Hampton and Ermine J. Thompson, No. 1,711,229, issued April 30, 1929, to which reference may be had for a further description thereof.

A description will now be given of the construction of the stationary contact that is engaged by the switch blade 25 when the switch 5 is closed. The contact structure 50 is secured to the bus 7 by means of a contact adapter 51 and a pair of U-shaped bolts 52—52. The adapter is provided with two sets of slotted ears 53 through which the arms of the U bolts extend and to which the U bolts are secured by means of nuts 54. Upon tightening of the nuts 54 the contact adapter 51 is rigidly secured to the bus 7. While we have shown a pair of U bolts for securing a contact adapter to the bus specifically different means may be used if desired. One such means is shown in the patent of Alfred Alsaker, No. 1,918,441, issued July 18, 1933. The contact adapter is provided with bosses 55 having central tapped openings therein through which screw punches 56 are threaded. These screw punches may be of a construction such as is shown in the pending application of Alfred Alsaker, Serial No.

325,751, filed December 13, 1928, and are provided, at the edge of the shank thereof, with a punching portion that is adapted to cut its way into the metal of the bus 7 to rigidly secure the contact adapter against turning on the bus or sliding movement thereon.

A pair of inverted L-shaped contact supports 60 and 61 are rigidly bolted to the contact adapter, said contact adapter being provided with a boss 62 for facilitating this mounting. The horizontal arm 61 of the contact support is slightly longer than the corresponding arm of the contact support 61 whereby the vertical arms of the two contact supports are spaced apart. A contact tongue 64, of copper or the like, is mounted between the two contact suports 60—61 by means of four bolts indicated at 65. The contact tongue 64 has a blade guiding and bumper member 68 and a spring bumper 69 secured thereto as by means of bolts. The guide member 68 has two prongs 70 and 71 extending outwardly therefrom and provided with outwardly flared surfaces 72 for guiding the blade 25 into position as blade approaches its full closed position. The bumper spring 69 includes a curved portion which extends between the arms 70—71 and provides a resilient cushioning stop for the blade as the blade approaches its full closed position.

A sleet shield 75 is mounted upon the contact adapter 51 by means of the bolts 76 that also serve to secure the contact supports 60 and 61 to the contact adapter. This sleet shield comprises a top, a side wall 78, and a rear wall 79. The sleet shield may be made of suitable material such, for instance, as sheet iron.

An explanation will now be given in the manner of operation of the switch 5. To actuate the switch to the open position the bus member 2 is rotated in a clockwise direction as is seen in Figure 2. The blade carriage 10 is thus turned in a clockwise direction. Upon the initial movement of the blade carriage the pin 24 moves upwardly, as may be seen more clearly in Figure 3, thereby forcing the blade 25 to move upwardly. This produces a powerful ice-breaking movement between the engaged main contacts tending to shear them apart. The blade 25 is being subjected to substantially no bending stress and therefore a relatively large force may be exerted thereon by the blade carriage 10. After a predetermined rotation of the blade carriage 10 the abutment 29 of the blade carriage engages the pin 27. The pin and the abutment now prevent further relative turning of the blade 25 with respect to the blade carriage and, upon further clockwise rotation of the blade carriage, the blade 25 is caused to swing integrally with the carriage. During the initial switch opening operation the counterbalance arm 36 is maintained in a vertical position by the counterbalance 35. After the pin 27 engages the abutment 29 further rotation of the blade causes it to abut against the member 41 of the counterbalance arm and thereafter the counterbalance moves as a rigid body with the blade carriage and maintains the blade against the stop 29. It is to be noted that as the blade approaches its full open position the gravitational effect upon the blade tends to turn it about its pivot 30 to bring the pin 27 against the abutment 28. This gravitational effect is of increasing force as the switch approaches its open position. If the spring 29 were exclusively relied upon to maintain the pin 27 against the stop 29 then an exceedingly powerful spring would necessarily have to be used, which would necessitate the exertion of a rather great force upon the switch to fully close the same. However, by the provision of the counterbalance, the gravitational effect upon the blade is counteracted by means which also is of increasing effect as the switch approaches its open position.

To close the switch 5 the bus member 2 is rotated in a counterclockwise direction. This causes the switch blade to swing about the axis of the bus member 2 until it comes substantially opposite and slightly above the contact 64, being guided into this position by blade bumper and guiding member 68. The blade 25 reaches a vertical position when the blade carriage 10 is substantially 30° from the position as shown in full lines in Figures 2 or 3. At this time the pin 27 is in engagement with the abutment 29. During the last 30° movement of the blade carriage 10 the blade 25 is restrained against counterclockwise rotation about the center of the bus member 2 by the stop bumper 68. During this motion the blade 25 will be drawn downward substantially longitudinally thereby causing the contact shoes to move over the contact tongue 64 and embrace the same.

The switch 6 is of a construction substantially similar to that of the switch 5. The blade carrier 10' of this switch is not provided with any counterbalancing arrangement since this is not necessary in the case of an under-hung switch. The sleet hoods 75' of this switch is also somewhat different from the sleet hood 75 of the switch 5. This sleet hood is mounted upon the contact tongue 64 by means of the same bolts that secure the bumper spring 69 to the bumper 68. In other respects this sleet hood is substantially similar to the sleet hood of the switch 5.

To actuate the switch 6 to the open position the bus member 3 is rotated in a counterclockwise direction. The action of this switch in opening is substantially the same as the action of the switch 5 previously described. As the blade carriage 10 moves downward it causes the switch blade to move downwardly until the pin 27 is engaged by the stop elements 29 and thereafter the blade is swung away from the contact tongue 64. During the swinging movement the blade is retained against turning around the pivot 24 by the stop 29 which is in engagement with the pin 27. It is to be noted that in this switch the gravitational force upon the switch blade is in a direction such as to force the pin 27 against the stop 29, whereas in the switch 5 the action of gravity is such as to cause the pin 27 to tend to move away from the stop 29. It is for this reason that a counterweight is necessary in connection with the switch 5 and is unnecessary in connection with the switch 6.

While the present invention is particularly applicable to switches of the kind mounted upon a rotatable bus, it is not limited thereto but is of general application. In Figure 6 we have shown a grounding switch constructed in accordance with the principles of the present invention. This switch is adapted to ground a line conductor 100. The switch is supported by means of two outwardly facing channel sections 101 and 102 which are secured together in spaced relationship and support a depending insulator 103. The insulator 103 is rigid with respect to its support 102 and is provided at its base with an insulator pin 104 having a flange 105. A contact tongue assembly is secured to the flange 105 by means of four bolts indicated at 106. The contact tongue assembly comprises a contact tongue 107 comprising a flat plate-like member secured between two angle members 108 and 109 by means of bolts 110. A sleet hood 112 is interposed between the angle members and the flange 105 of the insulator pin, the sleet hood being secured to the contact tongue assembly and to the insulator pin by means of the bolts 106 that secure the entire assembly to the pin. The sleet hood 112 may comprise merely an inverted channel shaped sheet iron member.

A lug adapter 115, of copper or the like, is bolted to the contact tongue by means of a set of bolts indicated at 116—116. A clamp base 120 is secured to the base 121 of the lug adapter. This clamp base is adapted to have the conductor 100 clamped thereto by means of a cooperating clamp 122 which is bolted to the clamp base by means of a number of bolts 123. The clamp base and the clamp are provided with cooperating semi-circular grooves to facilitate clamping of the line conductor 100 in place. Two sets of grooves at right angles to one another are preferably provided so as to permit the use of the clamp adapter should the conductor 100 extend at right angles to the direction shown in Figure 6.

A guiding bumper 68 and a bumper spring 69, such as have been described more particularly in connection with the switch of Figure 1, are mounted upon the contact tongue in the same manner as these parts are mounted upon the contact tongue of the switch of Figure 1.

A switch blade 130 is mounted upon a blade carriage 131, the blade and carriage being of a construction similar to that of the corresponding parts of the switch 6 of Figure 1. The blade carriage is mounted upon a shaft 133 which is suitably journaled in bearings 134 and 135 that are mounted upon the channel members 101 and 102, respectively. This shaft constitutes the supporting and actuating member for actuating the switch 130 and may be rotated in any desired manner. A pair of counter-weights 136 and 137 are mounted on the shaft 133 upon the opposite sides of the switch blade. These counter-weights are supported upon arms 138 that are suitably keyed to the shaft 133.

When the switch blade is in its closed position the conductor 100 is grounded through the contact tongue 107, the blade 130, and a flexible braided copper conductor 140 that extends from the mounted end of the blade to the base 101, being suitably clamped thereto. When it is desired to remove the ground connection from the contact tongue 107, the switch is actuated to the open position. To accomplish this end the shaft 133 is rotated in a generally clockwise direction, as seen in Figure 6, through an angle of approximately 120°. Upon the initial operation of the blade carriage 13, the blade 130 is pushed downwardly in a direction extending substantially longitudinally of the blade. After the blade carrier 131 has rotated through an angle of approximately 30°, the blade is caused to swing integrally with the carrier 131 for approximately 90°, all in a manner such as has been previously set forth in connection with the switch 6 and in connection with the switch 5.

When the switch is in its closed position, as seen in Figure 7, the counter-weights tend to turn the shaft 133 in a counter-clockwise direction, that is, they tend to maintain the blade in its closed position. As the switch is being actuated to the open position, the counter-weights soon shift to the opposite side of the center of the shaft 133 and thereafter they tend to assist in the opening movement of the blade. The blade is preferably over counter-weighted so that the counter-weight will of its own accord tend to maintain the blade in its open position once the blade has been moved to the open position. This is of a distinct advantage in a groundng switch for, should the switch blade be accidentally moved to the closed position by the effect of gravity thereon, a ground will be placed upon the line with serious consequences. On the other hand, it is desirable that the switch remain in its closed position once it has been moved to that position, since when the line is being grounded, this is done for a definite purpose and, should the ground be accidentally removed, the resulting condition may be quite dangerous to workmen working around apparatus to which the line is connected. In our present arrangement the counter-weight biases the switch blade to its closed position when the switch is at or near its closed position and biases the blade to the open position when the blade is at or near its open position.

The switch shown in Figure 6 is adapted for gang operation. On a three phase system the three line conductors 100 will be spaced from one another in a horizontal plane and three switches, such as shown in Figure 6, may be mounted upon the same operating shaft 133 whereby upon rotation of this shaft all three of the switches are simultaneously rotated.

In compliance with the requirements of the patent statutes, we have herein shown and described a few preferred embodiments of our invention. The invention is, however, not limited to the precise constructions herein shown, the same being merely illustrative of the principles of the invention. What we consider new and desire to secure by Letters Patent is:

1. A switch including a blade carriage mounted for swinging movement, a blade pivotally mounted on the carriage, and a counterweight member for the blade, said counterweight member being pivoted to the carriage between the supported end of the carriage and the blade pivot and having abutting engagement with the blade.

2. A switch including a blade carriage mounted for swinging movement, a blade pivotally mounted on the carriage, a counterweight member for the blade, said counterweight member including an abutting member pivoted to the carriage between the supported end of the carriage and the blade pivot and having abutting engagement with the blade and carrying a counterweight, abutment means for limiting the extent of pivotal movement of the blade with respect to the carriage during the switch opening operation, said blade being biased to move away from said abutment means when in the switch open position and said counterweight opposing said bias.

3. A switch comprising a rockable blade supporting arm, a switch blade pivoted thereon and actuated thereby, and a counterweighted member pivoted to the arm at a point spaced from the center of gravity of the member and having abutting engagement with the blade for biasing the blade to a predetermined position with respect to the arm as the arm swings to the switch open position.

4. A switch comprising a rockable blade supporting arm extending in a generally horizontal direction when the switch is closed, a switch blade pivoted thereon and actuated thereby, and a counterweighted member pivoted to the arm and having abutting engagement with the blade for biasing the blade to a predetermined position with respect to the arm as the arm swings to the switch open position.

5. A switch comprising a rockable blade supporting arm extending in a generally horizontal direction when the switch is closed, a switch blade pivoted thereon and actuated thereby, and a counterweighted member pivoted to the arm between the supported end of the arm and the blade pivot, whereby upon rocking of the arm the counterweight pivot is moved through a lesser vertical distance than the blade pivot is moved, said blade pivot having abutting engagement with the blade for biasing the blade to a predetermined position with respect to the arm as the arm swings to the switch open position.

6. In combination, a pair of busses extending substantially parallel to one another in spaced relationship, a rotatable bus disposed between them, said rotatable bus comprising two parallel rotatable members, a pair of blade supporting arms mounted on said members and both extending in the same direction therefrom, switch blades mounted on the respective arms, each of the blades extending from its arm in a direction away from the other arm, contacts mounted on the first mentioned busses and engaged by the respective blades, said blade supporting arms being rotated by their supporting bus members in a direction away from one another and towards their respective contacts, each of said blades having pivotal connection with its supporting arm, and means for limiting the extent of turning of the blades about their supporting arms to a fractional amount of the extent of turning of said arms; and a counterweight pivotally mounted on said upper arm and having engagement with the blade for urging the blade to a predetermined angular position with respect to the arm when the switch is open.

7. A switch contact comprising a substantially flat plate, a forked blade-guiding member secured thereto and having outwardly and laterally extending prongs, and a spring blade-bumper extending vertically between the prongs of the forked guiding member beyond the periphery of said plate.

8. A switch including a contact, a comparatively short pivoted arm, a comparatively long blade pivoted on the arm and cooperating with the contact, cooperating stop means on the arm and on the blade for limiting the extent of pivoting movement of the blade with respect to the arm, said blade and said arm being in a position at a substantial angle to one another when the switch is closed, and means for rotating the arm in a direction toward the contact to initiate the switch opening movement by pushing the blade substantially longitudinally across the contact during approximately 30° of rotation of said arm until the stop means on the blade and arm come into engagement, said blade thereafter rotating as a unit with the arm to its switch open position upon continued opening movement of the arm, and means tending to retain said stop means in engagement until the blade has again engaged said contact in switch closing position.

9. A switch including a support, an insulator mounted on the support, a contact mounted at one end of the insulator, a comparatively short switch arm pivoted adjacent the mounted end of the insulator, a comparatively long switch blade pivoted on the arm and cooperating with the contact, said blade extending substantially parallel to the insulator when the switch is closed, and cooperating stop means on the arm and on the blade for limiting the extent of pivoting movement of the blade with respect to the arm, said arm extending at substantially right angles to the insulator when the switch is closed, means for swinging the arm to initiate the switch opening movement by moving the blade substantially longitudinally to bring the stop means into engagement and then to swing the blade as a unit with the arm to its full open position upon continued movement of the arm, and a counterweight for the switch, said counterweight biasing the arm in one direction when the switch is closed and in the opposite direction when the switch is open and rocking about a horizontal axis from the switch closed position on one side of the vertical plane passing through its axis of rotation to a switch open position on the other side of that vertical plane, said counterweight being located adjacent said vertical plane when the switch is closed, whereby the reversal of force takes place upon the initiation of the switch opening movement and immediately prior to the completion of the switch closing movement.

10. In combination, in a switch structure, a horizontal bus conductor, a vertically spaced normally extending rotatable horizontal bus conductor, an arm carried by and rotatable with said second bus conductor, a contact structure carried by said first bus conductor, a relatively long switch blade pivotally mounted at one end on the end of said arm, means at the opposite end of said blade for engaging said contact structure, and lost motion connecting means between said arm and blade at the pivotal connection thereof whereby upon switch closing movement of said arm said contact engaging means is first rotated into a position of spaced vertical alignment with said contact structure and said blade member is thereafter moved axially of itself to force said contact engaging means across said contact structure in a direction substantially normal to the preceding rotational movement thereof.

JOSEPH C. RAH.
MANFRED STENE.
ELIAS S. CORNELL.